United States Patent
Voigt et al.

(10) Patent No.: US 6,684,313 B2
(45) Date of Patent: Jan. 27, 2004

(54) MANAGING STORAGE CONTENTION IN AUTOMATED STORAGE SYSTEMS

(75) Inventors: Douglas L. Voigt, Boise, ID (US); Bruce A Olsen, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 261 days.

(21) Appl. No.: 09/931,081

(22) Filed: Aug. 15, 2001

(65) Prior Publication Data

US 2003/0037214 A1 Feb. 20, 2003

(51) Int. Cl.[7] ............................................. G06F 12/00
(52) U.S. Cl. ...................... 711/170; 709/105; 707/7; 711/112; 711/114; 711/170; 711/202; 711/209
(58) Field of Search .................... 711/112, 114, 711/170, 202, 209; 709/105; 707/7

(56) References Cited

U.S. PATENT DOCUMENTS

| | | | |
|---|---|---|---|
| 4,528,624 A | | 7/1985 | Kamionka et al. |
| 5,392,244 A | | 2/1995 | Jacobson et al. ............ 356/517 |
| 5,671,405 A | * | 9/1997 | Wu et al. ..................... 707/7 |
| 5,770,951 A | | 6/1998 | Cheung et al. |
| 5,960,451 A | | 9/1999 | Voigt et al. .................. 711/114 |
| 6,351,744 B1 | * | 2/2002 | Landresse ..................... 707/8 |

OTHER PUBLICATIONS

"HP Disk Array with AutoRAID Models 12 and 12H: HP 9000 Enterprise Servers and Workstations".
The HP AutoRAID Hierarchical Storage System (0734–2071/96 Wilkes et al; ACM Transactions on Computer Systems, vol. 14, No. 1, ACM 1996, pp. 1–27.

* cited by examiner

Primary Examiner—Mano Padmanabhan
Assistant Examiner—Mehdi Namazi (57) ABSTRACT

An automated process of assigning storage resources to logical units ("LU's") is informed of contention avoidance, in order to yield reduced contention. LU's are defined and assigned to logical groups. Then a process having automatic aspects assigns physical storage resources to the LU's responsive to the LU logical groupings. In another aspect, the assignment of physical storage resources is responsive to the logical groups in a manner such that the LU's in one logical group cannot contend for physical storage resources with the LU's in another group, but the LU's in a single group may contend with one another. In lieu of LU's being manually assigned to logical groups, certain contention avoidance relations among the LU's are defined and then an automated process assigns the LU's to logical groups responsive to the contention avoidance relations.

16 Claims, 7 Drawing Sheets

MANAGING STORAGE CONTENTION IN AUTOMATED STORAGE SYSTEMS

FIELD OF THE INVENTION

This invention relates to nonvolatile memory systems, such as computer disk arrays, having data access contention management.

BACKGROUND OF THE INVENTION

Many software programs access data stored on arrays of disks, which are typically accessed via a network. For example, with recent the growth of the Internet and Web Hosts, there has been a corresponding growth in storage server applications in which software programs access data on disk arrays. Conventionally, storage space on each disk of a disk array is divided into blocks, data is assigned to sets of blocks and each set of blocks is spread across a number of the disks.

In many cases, a network administrator has information about the nature of the data or how the software programs access the data and can use this information to reduce contention among accesses to the disks. As a simple example, consider that the administrator knows two software programs will commonly be running concurrently. Therefore, if the two programs access data that is on the same set of disks, the programs will contend for the disks and slow down program execution. Furthermore, it is common that the programs will access the data as data streams. During a data stream connection to a set of blocks, the disks for those blocks are less available for other data transfers. Thus, data-stream-type transfers tend to further aggravate the disk contention.

If the administrator knows that the two programs frequently access two sets of data which are largely different sets, the administrator can use this information to assign the data to two different sets of disks in the disk array so that data accesses to the two sets of data can be more nearly independent of one another. As a result, the two programs can run faster. Moreover, this also tends to reduce the effects of data loss.

An LU is a container for data. The data is stored on groups of blocks on one or more disks. LU's are created and then data on the groups of blocks are assigned to the LU's. The process of assigning data blocks to LU's may be a tedious, time consuming and error prone manual process or it may be a process having automatic aspects, as is described in the following publications, which are hereby incorporated herein by reference: Voigt, Ahivers, and Dolphin, U.S. Pat. No. 5,960,451, "System and Method for Reporting Available Capacity in a Data Storage System with Variable Consumption Characteristics," Sep. 28, 1999; Jacobson, Fordemwalt, Voigt, Nelson, Vazire, and Baird, U.S. Pat. No. 5,394,244, "Memory Systems with Data Storage Redundancy Management," Feb. 21, 1995; "HP Disk Array with Auto-RAID Models 12 and 12H; HP 9000 Enterprise Servers and Workstations"; J. Wilkes, R. Golding, C. Staelin and T. Sullivan, "The HP AutoRAID hierarchical storage system," Hewlett-Packard Laboratories, Palo Alto, Calif., SIGOPS '95 December 1995 CO, USA; "ACM Transactions on Computer Systems," vol. 14, No. 1, ACM 1996, pp. 1–27, Wilkes et al., "The HP AutoRAID Hierarchical Storage System" (0734-2071/96). The process having automatic aspects is less time consuming and error prone than the manual process but tends either to not take into account certain data access patterns or to require substantial manual intervention to do so. Therefore a need exists to marry the best aspects of manual and automatic assignment of storage resources.

SUMMARY OF THE INVENTION

The foregoing need is addressed in the present invention, according to which contention avoidance information is imparted to an automated process of assigning storage resources to Logical Units ("LU's"). It is an objective for the more informed, automated process to yield reduced contention. In an aspect of the invention, LU's are manually defined and assigned to logical groups. That is, some of the LU's are grouped together as a first logical group and others of the LU's are grouped together as a second logical group. There may also be other LU's in a third logical group, and fourth logical group, and so on. Then a process having automatic aspects assigns physical storage resources to the LU's responsive to the LU logical groupings.

The physical storage resources may include any nonvolatile, randomly accessible, rewritable mass storage device which has the ability of detecting its own storage failures. It includes both rotating magnetic and optical disks and solid-state disks, or nonvolatile electronic storage elements (such as PROMs, EPROMs, and EEPROMs).

As used herein, the term "automatic" refers to a method, apparatus or computer program product which proceeds or is operable to proceed or enables proceeding, without human intervention to some extent and does so according to predetermined constraints or algorithms.

In one aspect, the assignment of physical storage resources is responsive to the logical groups in a manner such that the LU's in one logical group cannot contend for physical storage resources with the LU's in another group. That is, physical storage resources are assigned to the LU's in the first logical group such that the physical storage resources are independent of the storage resources assigned to the LU's in the second logical group. Likewise, if there is a third logical group, the physical storage resources are assigned to LU's in that logical group and those physical storage resources are independent of the storage resources assigned to the LU's in the first and second logical groups, and so on for all the logical groups. While an administrator must assign LU's to logical groups, it is advantageous that the administrator does not deal with the more laborious assignment of physical storage resources, but still achieves a reduction in contention for the physical storage resources.

In one aspect, the process assigns physical storage resources to the LU's in a manner such that the LU's within a logical group are capable of contending for the physical storage resources with one another. That is, for example, the physical storage resources automatically assigned to a first LU in the first logical group are not necessarily independent of the physical storage resources automatically assigned to a second LU in the first logical group.

In another feature, any LU's not manually assigned to logical groups are deemed a default logical group, and when the process assigns the physical storage resources to the LU's the process does this in a manner such that the LU's in the default logical group cannot contend for physical storage resources with the LU's in the other logical groups.

As described above, LU's are manually assigned to logical groups with the understanding that the logical groups will be automatically assigned to physical storage resources in such a way that the logical groups will not contend with one another for physical storage resources. In an alternative, in lieu of LU's being manually assigned to logical groups, certain contention avoidance relations among the LU's are manually defined and then an automated process assigns the LU's to logical groups. According to one feature of this alternative, individual pairs of LU's are manually assigned a contention avoidance value with respect to one another. In one alternative, the value is binary and designates that the two LU's of a pair should either avoid or else permit contention. Then, an automatic process assigns the LU's to logical groups. The automatic process assigns an LU to a logical group responsive to the LU's contention avoidance value with respect to other LU's already assigned to the logical group.

In one aspect, the automatic assigning of LU's to logical groups is responsive to the respective LU contention avoidance values in a manner such that if a first LU has an "avoid contention" value with respect to a second LU, the first and second LU's are assigned to different logical groups. Furthermore, the logical group for the first LU and the logical group for the second LU are accordingly assigned physical storage resources such that the two logical groups do not contend for physical storage resources with one another.

In another aspect of the alternative, the automatic assigning of LU's to logical groups proceeds in a serial fashion, according to which, a first one of the LU's is assigned to a logical group, then a next LU is assigned, then a next, and so on. Thus it is inherent in this process of assigning LU's to logical groups that the size of a logical group grows as more LU's are assigned to it during the process. Furthermore, each LU is assigned to the logical group that is the largest group, at the time of the assignment, among those logical groups to which the LU may correctly be assigned. That is, the LU may be correctly assigned only to a logical group having solely LU's that are compatible with the contention avoidance value for the LU that is being assigned at the time.

In a further aspect, the process for automatically assigning physical storage resources to the LU's includes automatically grouping the physical storage resources, i.e., assigning the physical storage resources to physical groups and mapping the physical groups to the logical groups. It also includes mapping blocks within such a physical group to the LU's within the logical group or groups mapped to the physical group.

Other objects and advantages of the invention will become apparent upon reading the following detailed description and upon reference to the accompanying drawings.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

In the following detailed description of the preferred embodiments, reference is made to the accompanying drawings illustrating embodiments in which the invention may be practiced. It should be understood that other embodiments may be utilized and changes may be made without departing from the scope of the present invention.

While the invention is susceptible to various modifications and alternative forms, specific embodiments thereof are shown by way of example in the drawings and will be described herein in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Figure 1:
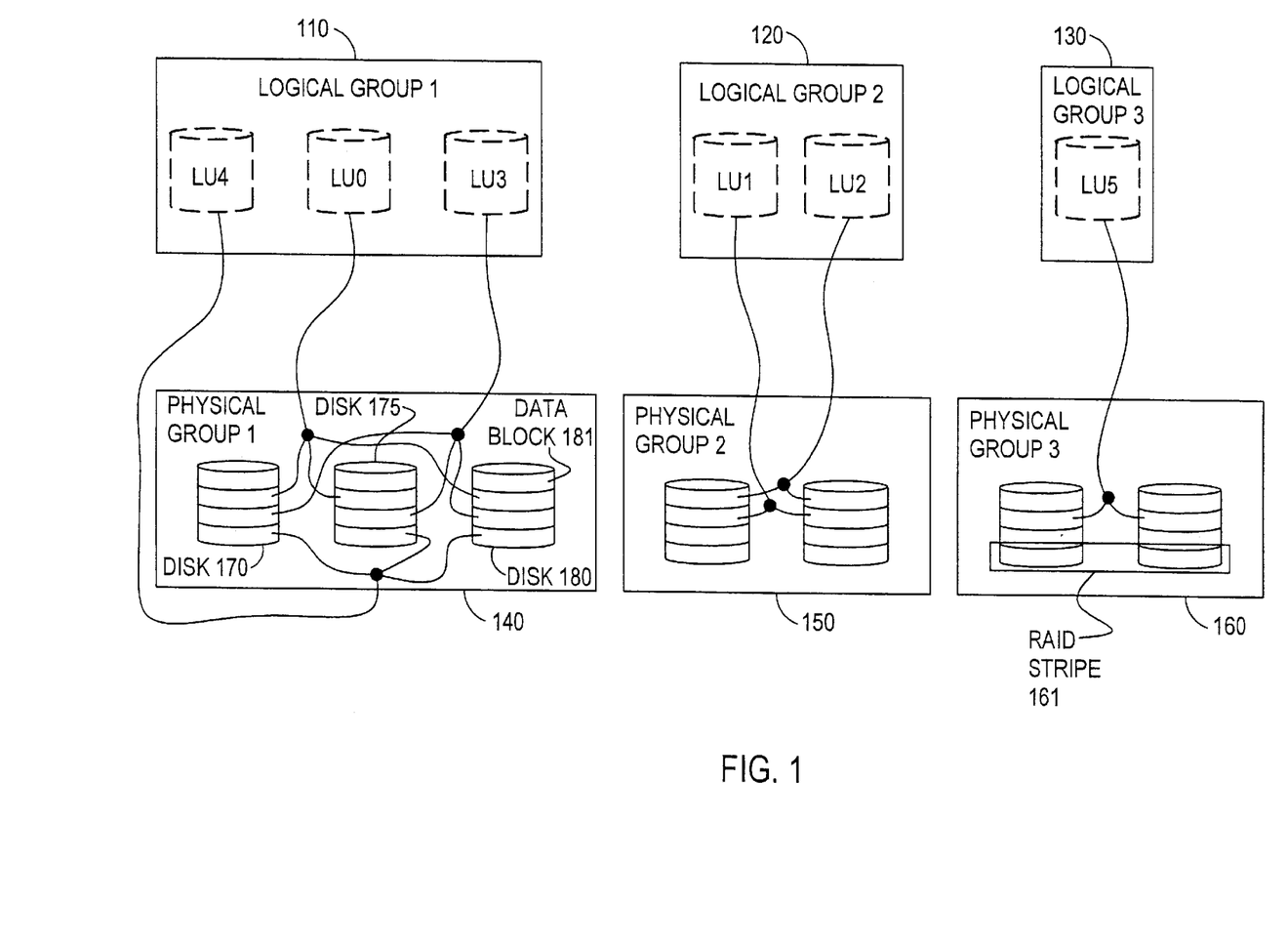
FIG. 1 illustrates logical groups and physical groups, according to an embodiment of the invention.

Referring now to FIG. 1, aspects of the invention are illustrated, according to an embodiment. As shown, LU's are grouped in logical groups. This grouping is done manually in one embodiment.

In another embodiment, described later hereinbelow, certain aspects of the grouping are automated. LU0, LU3 and LU4 are shown grouped together as a first logical group 110. LU1 and LU2 are grouped together as a second logical group 120. LU5 is assigned to a third logical group 130. In this illustration there are only three logical groups, but it should be understood that there could be a fourth logical group, a fifth logical group, and so on.

In the embodiment shown, physical storage resources are data blocks on disks. For example, disk 180, in the first physical group 140, is shown with four data blocks, one typical one of which, data block 181, is specifically numbered in FIG. 1. Also numbered, in the third physical group 160, is a typical RAID stripe 161, which includes the bottom data blocks on the two disks in the group 160. FIG. 1 illustrates assignment of these physical storage resources to the LU's responsive to the LU logical groupings in a manner such that the LU's in one logical group cannot contend for physical storage resources with the LU's in another group. That is, a first physical group of disks 140 is assigned to the first logical group 110. The first physical group 140 is independent of the second physical group of disks 150 assigned to the second logical group 120, since neither of the physical groups have disks in common. Likewise, a third physical disk group 160 is assigned to the third logical group 130. The third physical group is independent of the physical disk groups 140 and 150 assigned to the LU's in the first and second logical groups 110 and 120 respectively, since the third physical group does not have any disks in common with the first two physical groups. Later hereinbelow an embodiment is described that concerns further details about how physical resource groups are assigned to LU's.

Note that in an embodiment, physical groups are RAID redundancy groups across which striping and redundancy are employed. All of the disks in a RAID stripe are in one RAID group. As shown in the embodiment of FIG. 1, the bottom stripe of each disk in physical group 1 is assigned to LU4, the second stripe from the bottom of each disk is assigned to LU3, and the third stripe from the bottom is assigned to LU0. However, it is not meant to imply that the same block on each disk must be assigned to an LU. Disk blocks may be assigned to an LU in any pattern consistent with RAID algorithms. The capacity of a disk group is the net capacity after subtracting physical capacity that is used for redundancy in a given RAID mode.

Note also that in this embodiment, the physical disk groups are assigned to the LU's in a manner such that the LU's within a logical group are capable of contending with one another for the disks in the physical disk group. That is, for example, data blocks on disks 170, 175 and 180 are assigned to LU0 in the first logical group 110, while other data blocks on the same disks 170, 175 and 180 are assigned to LU3, and still other data blocks on the same disks 170, 175 and 180 are assigned to LU4 in the same logical group 110. Thus LU0, LU3 and LU4 can contend with one another for the same disks 170, 175 and 180.

In one feature, any LU's not manually assigned to logical groups are deemed to be a default logical group, and when the automatic process assigns the physical storage resources to the LU's the process does this in a manner such that the LU's in the default logical group cannot contend for physical storage resources with the LU's in the other logical groups. For example, in FIG. 1, LU5 may not have been manually assigned to any logical group, in which case the automatic process assigned LU5 to the third physical disk group 160, which is independent of the first and second disk groups 140 and 150.

Figure 2:
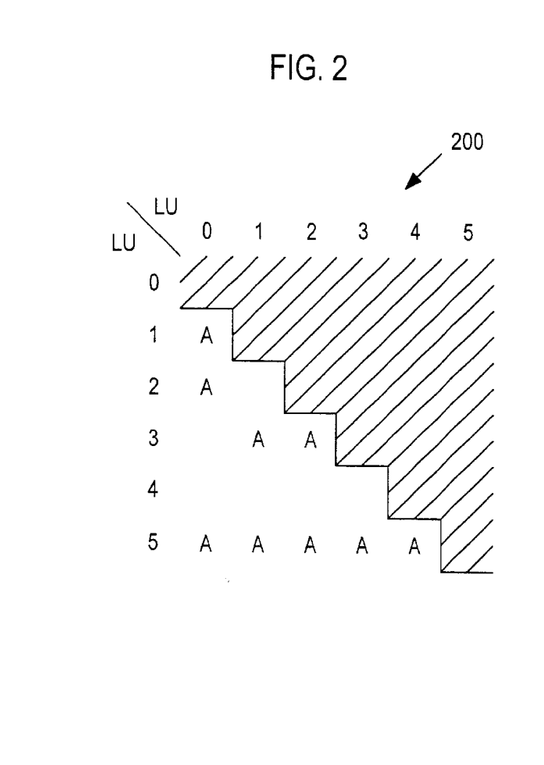
FIG. 2 illustrates a contention avoidance matrix, according to an embodiment.

Referring now to FIG. 2, a contention matrix 200 is illustrated. The contention matrix is a tool for automatically assigning LU's to logical groups. The contention matrix 200 of FIG. 2 defines certain contention avoidance relations among the LU's shown in FIG. 1. Then an automated process assigns the LU's to logical groups responsive to these predetermined contention avoidance relations. In the contention matrix 200, individual pairs of LU's are assigned a contention avoidance value with respect to one another. In the embodiment of FIG. 2, the value is binary and designates that the two LU's of a pair should either avoid contention, which is represented by an entry "A" in the matrix 200, or else permit contention, which is represented by no entry in the matrix 200. Thus, proceeding across the columns of the matrix 200 of FIG. 2, the first column of matrix 200 indicates that LU0 has contention avoidance values of "A" with respect to LU1, LU2 and LU5, and should therefore avoid contention with these LU's. The next column indicates LU1 has contention avoidance values of "A" with respect to LU3 and LU5. The next column indicates LU2 also has contention avoidance values of "A" with respect to LU3 and LU5. The next column indicates LU3 has a contention avoidance value of "A" with respect to LU5. The next column indicates LU4 also has a contention avoidance value of "A" with respect to LU5. (Note that these contention relations among LU5 and all the other LU's could either result from a manual assignment of these relations, or could arise from LU5 being defined by default, as described in the immediately preceding paragraph, according to which a logical group is assigned to LU5 by default and is deemed to require contention avoidance with all the other LU's.)

According to an embodiment, after the contention matrix 200 has been defined, an automatic process assigns the LU's to logical groups responsive to each individual LU's respective contention avoidance value. In one such embodiment, this is done in a manner such that if a first LU has an "avoid contention" value with respect to a second LU, i.e., an "A" entry in the matrix 200 at the intersection of the indices for the first and second LU's, the first and second LU's are assigned to different logical groups. Furthermore, the logical group for the first LU and the logical group for the second LU are accordingly assigned physical storage resources such that the two logical groups do not contend for physical storage resources with one another.

This may be better understood with reference to both FIGS. 1 and 2, as follows. As previously stated, the matrix 200 of FIG. 2 indicates that LU0 should avoid contention with LU1, LU2 and LU5. Thus, LU0 is assigned to a logical group 120 with solely LU3 and LU4, the only other LU's with which LU0 is compatible, that is, the only other LU's having no contention avoidance value of "A" with respect to LU0. Further, as shown in FIG. 1, according to this embodiment physical disk groups are assigned to logical groups with a one-to-one correspondence. Accordingly, physical disk groups 140, 150 and 160 are assigned exclusively to logical groups 110, 120 and 130 respectively. Thus, with these logical group and physical group assignments neither LU1, LU2 nor LU5 can contend with LU0 for the disks of the first disk group 140. Likewise, the matrix 200 of FIG. 2 indicates that LU1 should avoid contention with LU3 and LU5 and is compatible with LU2 and LU4, so LU1 is assigned to a second logical group 120 having LU2, and this logical group 120 is assigned exclusively to the second disk group 150. Finally, the only remaining LU is LU5, and matrix 200 of FIG. 2 indicates that LU5 should avoid contention with LU0, LU1, LU2, LU3 and LU4, so LU5 is assigned to its own logical group 130, which is exclusively assigned to the third physical disk group 160.

Figure 3:
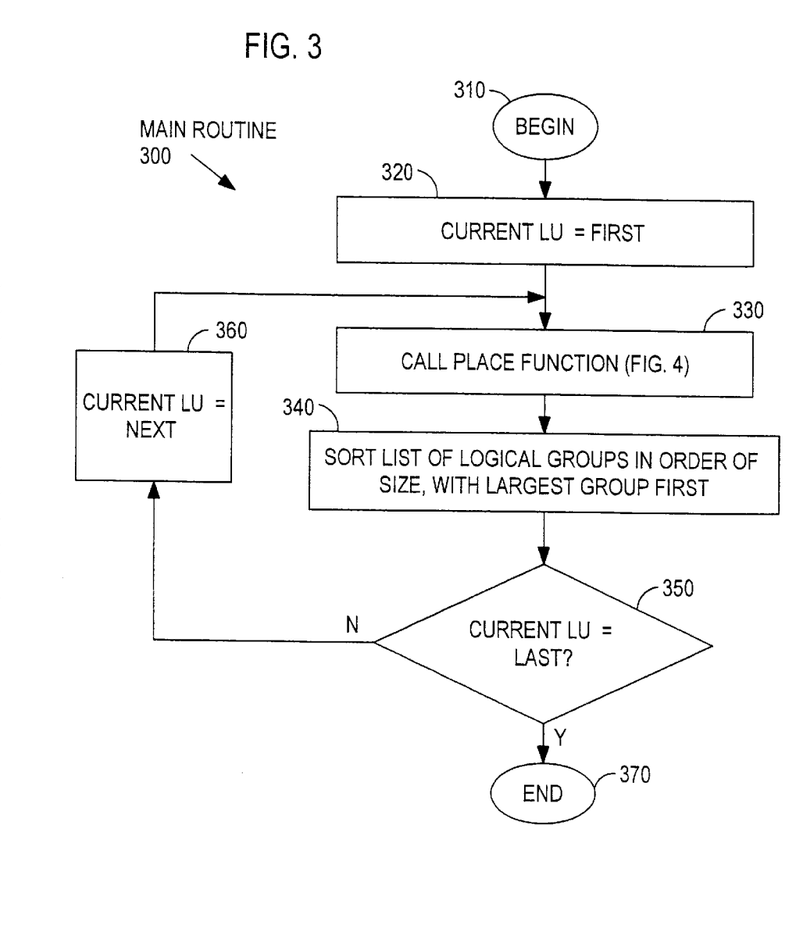
FIG. 3 illustrates a main algorithm for assigning logical units to logical groups, according to an embodiment of the invention.
Figure 4:
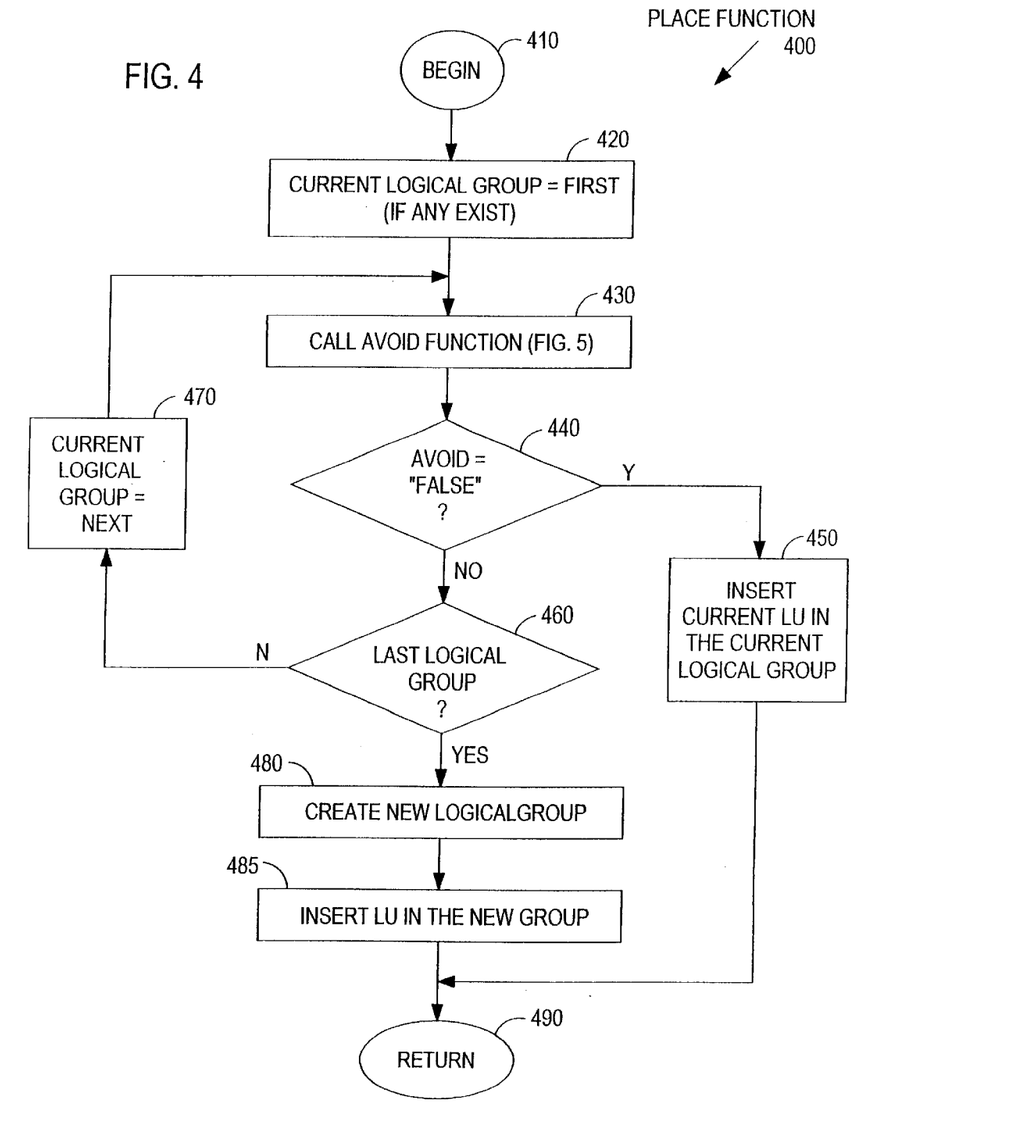
FIG. 4 illustrates a "place" function, according to an embodiment.
Figure 5:
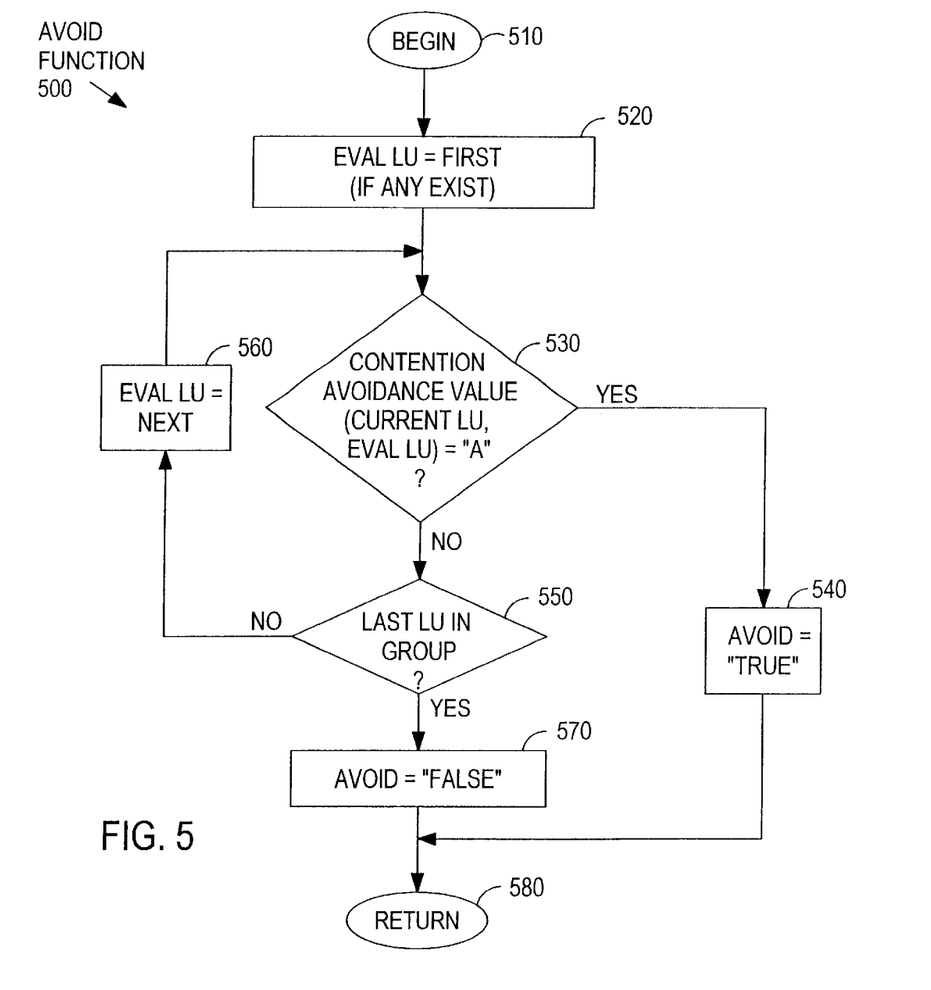
FIG. 5 illustrates an "avoid" function, according to an embodiment.

The method set out in FIGS. 3 through 5 for automatically assigning LU's to logical groups results in assigning a first one of the LU's to a logical group at a first time, then a next one of the LU's at a next time, and so on. Furthermore, during the assigning of LU's to logical groups, the size of a logical group grows as more LU's are assigned to the logical group, and each LU is assigned, at the time of its respective assignment, to a logical group that is largest among those logical groups having solely LU's compatible with the contention avoidance value for the LU that is being assigned at the time. Referring now to FIG. 3, method aspects are illustrated for a main routine 300 for automatically assigning LU's to logical groups, according to an embodiment. According to the routine 300 the assigning proceeds in a serial fashion. That is, after beginning, at 310, a variable "Current LU" is initialized at 320 to a first LU, e.g. LU0 in FIG. 1. Then, at 330, the "place" function is called for assigning the first LU to a logical group. It is inherent in this process of assigning LU's to logical groups that the size of a logical group grows as more LU's are assigned to it during the process. It is advantageous in at least some respects to assign each LU to the logical group that is the largest group, i.e., that has the largest capacity, at the time of the assignment, among those logical groups to which the LU may correctly be assigned. Larger disk groups have larger stripe sizes, yielding larger net capacity per physical disk in the group. This is a reason for biasing LU groups in favor of larger groups. The capacity of an LU group is the sum of the capacities of the LU's in the group.

In order to ensure that the next LU is assigned to the biggest logical group, the logical groups are sorted, at 340, in order of their size, with the largest logical group first.

Then, at 350, if the LU assigned to variable Current LU is the last logical group, the routine 300 ends at 370. Otherwise, the next LU is assigned to Current LU at 360, and the place function is again called at 330, to assign the next LU to a logical group, and so on.

Referring now to FIG. 4, method aspects are illustrated for the "place" function 400, according to an embodiment. After beginning at 410, the function 400 initializes the variable "Current Logical Group" to the first logical group at 420, which is the largest of the logical groups due to the sorting at 340 (FIG. 3). Then, at 430, the "avoid" function is called. If, at 440, the avoid function returns a value of "False" for the variable "avoid," then at 450 the current LU is inserted into the current logical group, and the function returns at 490. If, at 440, the avoid function returns a value of "True" for the variable "avoid," then if the current logical group is not the last, at 460, the Current Logical Group is set to the next logical group, at 470, and the avoid function is called again at 430, and so on. If the function 400 has proceeded serially through all the logical groups without finding one to insert the current LU into, so that at 460 the current logical group is the last, then a new logical group is created at 480, the current LU is inserted into the new logical group, at 485, and the function 400 returns at 490.

Referring now to FIG. 5, method aspects are illustrated for the "avoid" function 500, according to an embodiment. After beginning, at 510, the function 500 then initializes, at 520, a variable "Eval LU" to the first LU in the current logical group. Then, at 530, the contention avoidance value in the contention matrix 200 (FIG. 2) is checked for the LU which is being placed, i.e., variable Current LU set by main routine 300 (FIG. 3), and the current Eval LU of the current logical group. That is, if the subject LU pair, "Current LU, Eval LU," have a contention avoidance value of "avoid," then the function 500 returns a value of "True" for variable "avoid" at 540, and then returns at 580. If the subject LU pair have a contention avoidance value that is not "avoid" then, if the LU assigned to variable Eval LU is not the last LU in the current logical group, at 550, the variable Eval LU is set to the next LU at 560, and the contention avoidance value is looked up for the new LU pair at 530, and so on. If the last LU in the current logical group has been reached at 550, then the "avoid" variable is set to "false," and the function 500 returns at 580.

FIGS. 3 through 5 have illustrated method steps for assigning an LU to the largest logical group having solely LU's compatible with the current LU being assigned. The method may be better understood with reference to FIG. 6 as follows.

Figure 6:
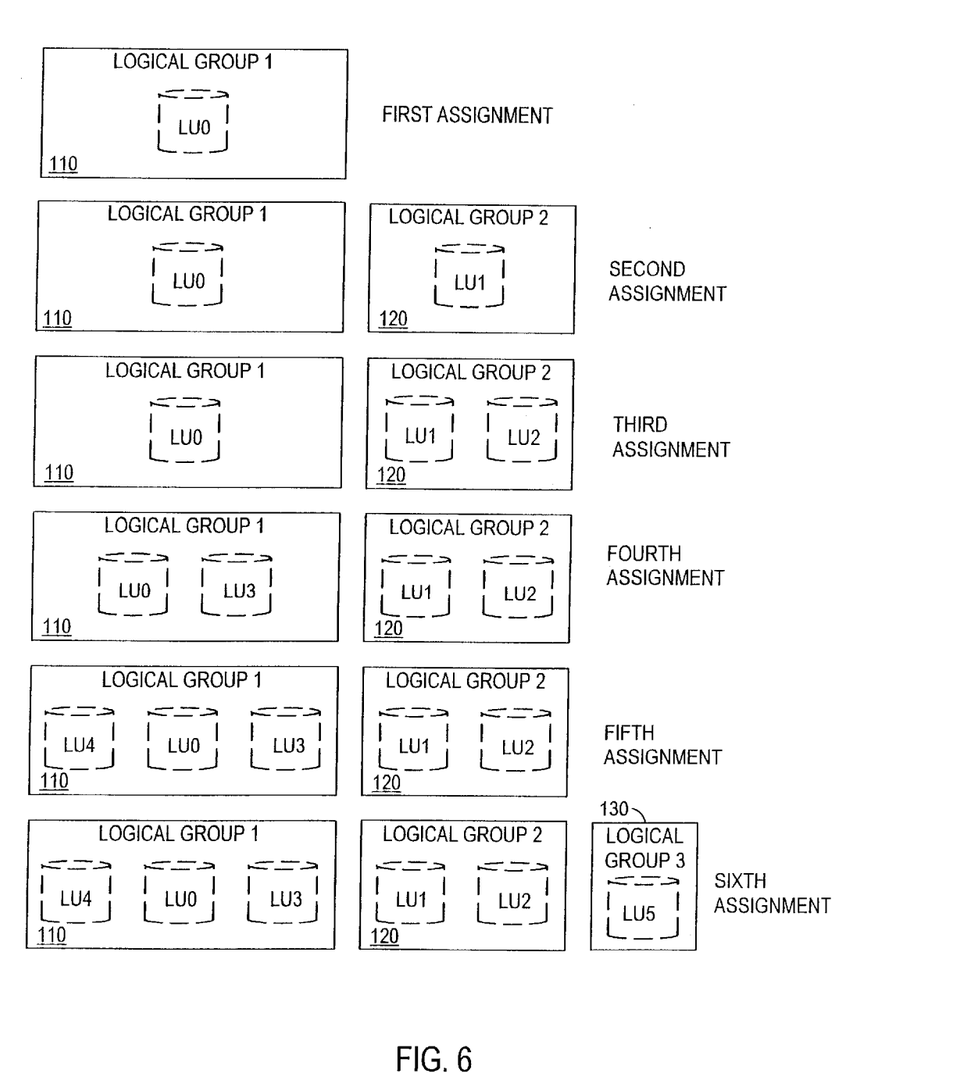
FIG. 6 illustrates a sequence of assignments of logical units to logical groups, according to an embodiment.

In the example of FIG. 6, the LU's are all the same size, except LU3, which is larger than any of the others. LU0 is the first logical storage unit to be assigned to a logical group in accordance with the algorithms set out in FIGS. 3 through 5. Since there are no logical groups initially defined, a first logical group 110 is defined for LU0. Next, LU1 is assigned. In accordance with the algorithms, the contention avoidance value for LU1 with respect to the LU's in the only existing logical group, i.e., LU0 in the first logical group 110, is checked for compatibility. Since the value in the matrix 200 (FIG. 2) for this pair of LU's is "A," LU0 and LU1 are not compatible, and since there is no other logical group at this time, a second logical group 120 is created and LU1 is assigned to it. Next, the logical groups 110 and 120 are sorted in order of size, so that the first logical group considered for the next placement is the largest. However, since both LU0 and LU1 are the same size, the logical groups at this point are also the same size, so the order of the logical groups 110 and 120 is inconsequential at this time.

Next placement of LU2 is considered. Since LU2 and LU0 are incompatible, and LU2 and LU1 are compatible, LU2 is assigned to the second logical group 120 with LU2. Then the groups 110 and 120 are sorted again. At this point, the second logical group 120 is ordered first, since it has two LU's, each of the same size as the one LU in first logical group 110, and is therefore bigger than the first logical group 110.

Next LU3 is placed, i.e., assigned in the fourth assignment. Consideration is first given to assigning LU3 to the second logical group 120, due to the larger size of the second logical group 120, but the contention matrix 200 (FIG. 2) dictates that LU3 must avoid LU1 and LU2, which are in the second logical group 120. So, LU3 is instead assigned to the first logical group 110.

Next, the logical groups are sorted again. The first logical group 110 now has LU0 and LU3, and the second logical group 120 now has LU1 and LU2, so the first logical group 110 is now bigger than the second logical group 120. Therefore, the first logical group 110 comes up first in the sorting, and is assigned the next LU, provided that the contention matrix 200 permits. With respect to contention, LU4 could go in any logical group, so LU4 is assigned in the fifth assignment to the first logical group 110, because it is the largest.

Next, the logical groups are sorted again. However, the contention matrix 200 dictates that the last LU, LU5 must avoid contention with all the other LU's, so a third logical group 130 is created for the sixth assignment, and LU5 is assigned to it.

Figure 9:
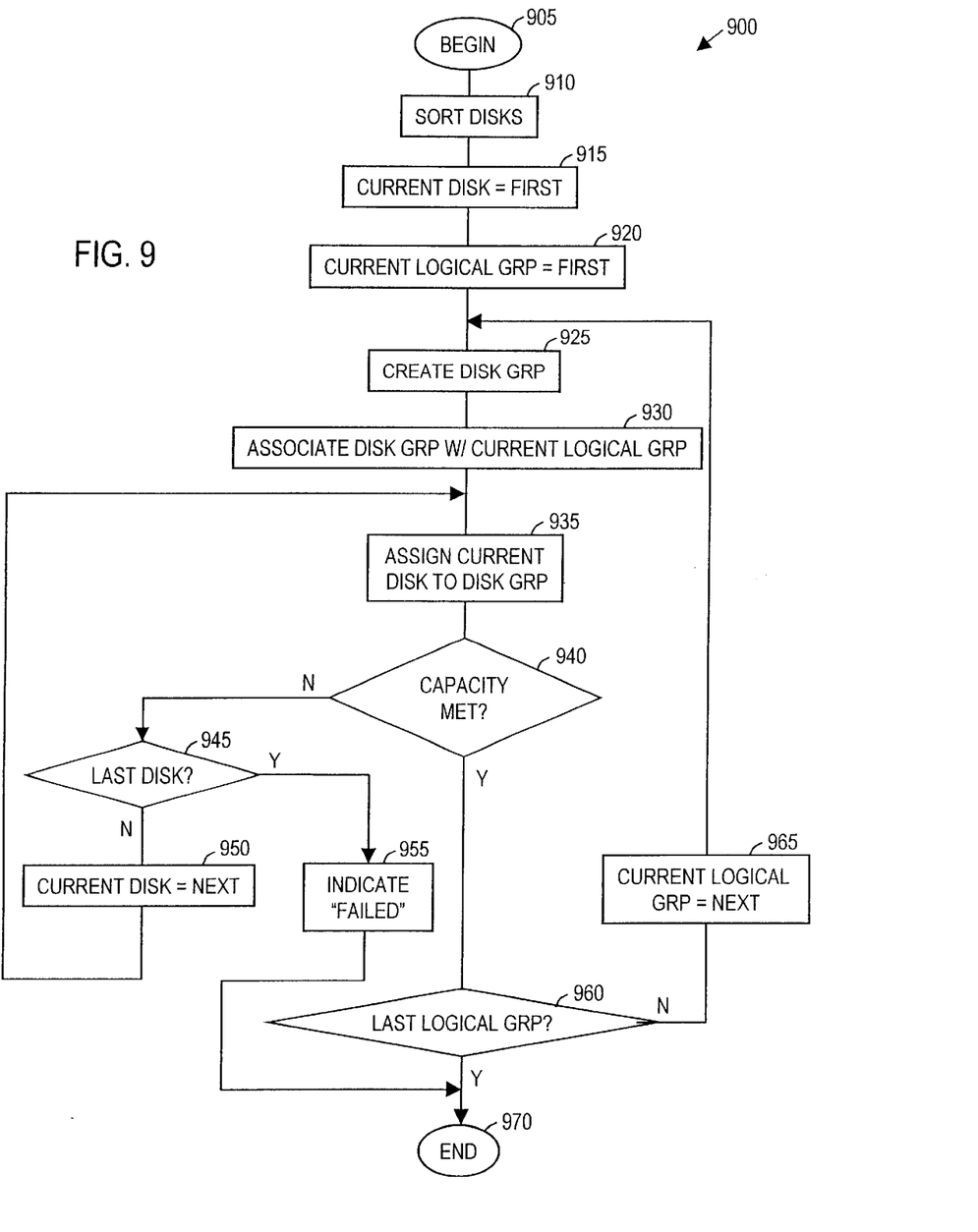
FIG. 9 illustrates an algorithm for assigning physical disks to logical groups, according to an embodiment.

Referring now to FIG. 9, an algorithm 900 is shown, beginning at 905, for assigning physical storage resources, i.e., disks to logical groups, according to an embodiment. The available disks which may be assigned to logical groups are sorted, at 910, in order of capacity, with the largest disk first. Then, at 915, the current disk variable is set to the first disk, and at 920, the current logical group is set to the first logical group. Next, at 925, a disk group is created. Then, at 930, the disk group is associated with the current logical group. And, at 935, the current disk is assigned to the disk group.

If, at 940, the capacity of the current logical group has been met, that is, if the capacity of the physical disks which at this point have now been associated with the logical group is sufficient, then at 960 the algorithm 900 checks to see if all logical groups have been handled.

If all logical groups have been handled, the algorithm 900 ends at 970. If all logical groups have not yet been handled, then at 960 the algorithm branches to step 965, at which point the current logical group is set to the next logical group. Then, at 925, another disk group is created, and so on.

If, at 940, the capacity of the logical group has not yet been met, the algorithm branches to 945, at which point it is determined whether there are any remaining disks available for assigning to logical groups. If there are no more disks available, then at 955 the algorithm returns a message indicating that it has failed to satisfy the capacity required. That is, there were not enough disks available. If, on the other hand, there are more disks available, as determined in step 945, then at 950 the current disk is set to the next disk, the new current disk is assigned, at step 935 to the current disk group, and so on.

Figure 7:
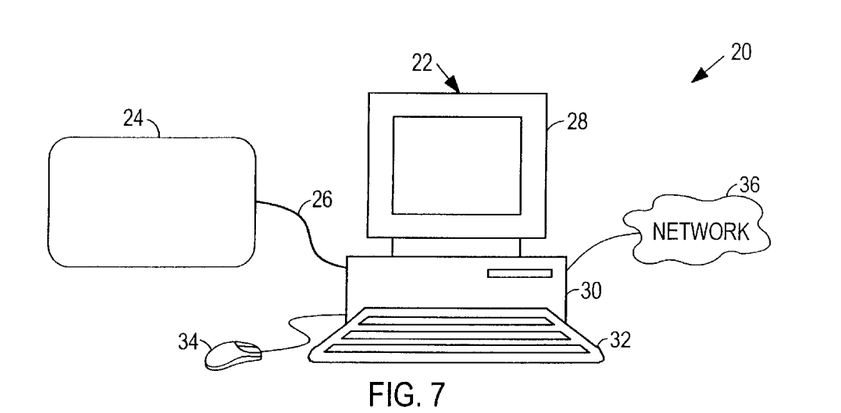
FIG. 7 illustrates a computer system generally applicable for the embodiments described herein.

Referring now to FIG. 7, a computer system 20 is shown having a host computer 22 connected to a data storage system 24 via an I/O interface bus 26. Instances of this system 20 are generally applicable for the embodiments described herein. Host computer 22 is a general purpose computer that can be configured, for example, as a server or workstation. Computer 22 has a visual display monitor 28, a central processing unit (CPU) 30, a keyboard 32, and a mouse 34. Other data entry and output peripherals may also be included, such as a printer, tape, CD-ROM, network interfaces, and so forth. In FIG. 7, the host computer 22 is coupled to a network 36 to serve data from the data storage system 24 to one or more clients (not shown).

The data storage system 24 holds user data and other information. In an embodiment, the data storage system 24 is a hierarchical RAID system that is capable of storing data according to different redundancy schemes. The host computer 22 provides an interface for an administrator to configure the memory space in the RAID system 24, run diagnostics, evaluate performance, and otherwise manage the RAID storage system.

According to one particular aspect of this invention, the host computer 22 enables the administrator to propose different memory configurations for the data storage system 24 during ongoing operation. For example, the administrator can define and specify characteristics of one or more LU's, including the contention avoidance values for the respective pairs of LU's. This can be done for hypothetical LU's, such as for study purposes, or the LU's can be actually created.

Figure 8:
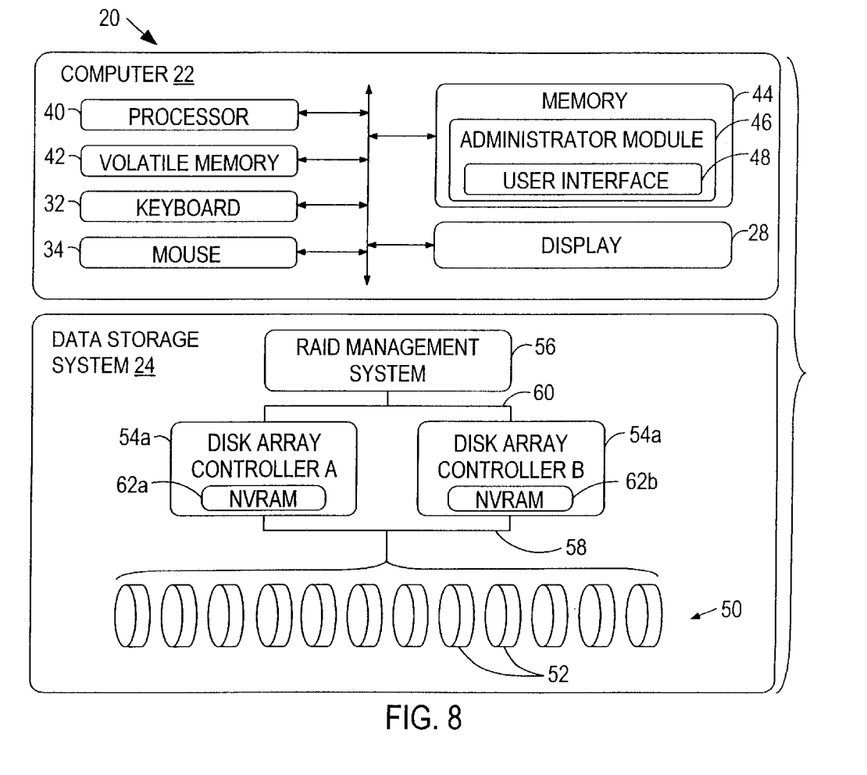
FIG. 8 shows, in more detail, the host computer and data storage system of the system of FIG. 7.

FIG. 8 shows the host computer 22 and data storage system 24 in more detail. The computer 22 has a processor 40, a volatile memory 42 (i.e., RAM), a keyboard 32, a mouse 34, a nonvolatile memory 44 (e.g., ROM, hard disk, floppy disk, CD-ROM, etc.), and a display 28. An administrator module 46 is stored in memory 44 and executes on processor 40.

The data storage system 24 has a disk array 50 with multiple storage disks 52, a disk array controller 54, and a RAID management system 56. The disk array controller 54 is coupled to the disk array 50 via one or more interface buses 58, such as a small computer system interface (SCSI). The RAID management system 56 is coupled to the disk array controller 54 via an interface protocol 60. It is noted that the RAID management system 56 can be embodied as a separate component (as shown), or within the disk array controller 54, or within the host computer 22. The RAID management system 56 is preferably a software module that runs on the processing unit of the data storage system 24, or on the processor 40 of the computer 22.

The disk array controller 54 coordinates data transfer to and from the disk array 50. The disk array controller 54 is implemented as dual controllers having a first disk array controller 54a and a second disk array controller 54b. The dual controllers enhance reliability by providing continuous backup and redundancy in the event that one controller becomes inoperable. The dual controllers 54a and 54b have nonvolatile RAM (NVRAM) 62a and 62b to provide cache memory, which is further presented to the user as part of the storage space.

The disk array 50 can be characterized as different storage spaces, including its physical storage groups (FIG. 1) and one or more logical storage groups (FIG. 1) each having one or more LU's (FIG. 1). Maps relate the various views of storage. The RAID management system 56 manages how user data is stored in the storage spaces according to different redundancy schemes, automatically assigns LU's to logical groups, logical groups to physical groups, LU's to data blocks, and so on, as described herein. U.S. Pat. No. 5,960,451 describes an administrator tool relating to these matters in more detail. This incorporated patent has a more detailed discussion of administration.

Those of ordinary skill in the art will appreciate that the hardware in FIGS. 7 and 8 may vary depending on the implementation. For example, other peripheral devices, such as optical disk drives and the like, may be used in addition to or in place of the hardware depicted. The depicted example is not meant to imply architectural limitations with respect to the present invention.

It is also important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

It should be understood from the foregoing, that it is a particular advantage of the invention that contention for storage resources is reduced with little human effort.

The description of the present embodiment has been presented for purposes of illustration, but is not intended to be exhaustive or to limit the invention to the form disclosed. Many modifications and variations will be apparent to those of ordinary skill in the art. For example, it should be understood that while contention avoidance values are binary and designates that the two LU's of a pair should either avoid or else permit contention, it would be within the spirit and scope of the invention to encompass an embodiment wherein the values could be non-binary. For example, the contention avoidance values in the contention matrix could represent degrees of avoidance on a sliding scale, such as a scale of one to ten, rather than having merely a binary value representing "avoid" or "permit" contention. Also, the algorithms shown in FIGS. 3 through 5 for assigning LU's to logical groups are exemplary bin packing algorithms. Variations of these algorithms could be used and still achieve the contention constraints set out herein.

Further, as has been described, the process for automatically assigning physical storage resources to the LU's includes automatically grouping the physical storage resources, i.e., assigning the physical storage resources to physical groups, and one embodiment has been described according to which the physical storage groups are assigned to logical groups on a one-to-one correspondence basis. It should be understood that this is not necessarily the only possibility. For example, there could be multiple physical groups assigned to a single logical group.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. A method for managing storage contention in an automated storage system, the method comprising the steps of:

a) assigning logical storage units ("LU's") to logical groups, wherein some of the LU's are grouped together as a first logical group, and others of the LU's are grouped together as a second logical group; and b) "assigning physical storage resources responsive to the LU logical groupings, wherein the physical storage resources assigned to the LU's in the first logical group are independent of the physical storage resources assigned to the LU's in the second logic group, so that the LU's in the first logical group cannot contend for physical storage resources with the LU's in the second logical group;

c) wherein step a) comprises assigning one of the LU's to a third logical group, and automatically assigning the LU's to the logical groups responsive to predetermined contention avoidance relations among the LU's, and step b) comprises assigning the LU's in the third logical group to physical storage resources that are independent of the storage resources assigned to the LU's in the first and second logical groups.

2. The method of claim 1 wherein step b) comprises assigning physical storage resources to the LU's such that the LU's within the first logical group are capable of contending with one another for the physical storage resources, and the LU's within the second logical group are capable of contending with one another for the physical resources.

3. The method of claim 1, wherein step b) comprises assigning the physical storage resources to physical groups, and assigning a first one of the physical groups to the first LU logical group and a second one of the physical groups to the second LU logical group, so that there is a one-to-one correspondence of physical groups and logical groups.

4. The method of claim 1, wherein the assigning in step a) comprises manually assigning LU's to logical groups, and wherein any LU's not manually assigned to logical groups are automatically assigned as a default logical group, and wherein step b) comprises assigning the physical storage resources to the LU's such that the LU's in the default logical group are assigned to physical storage resources that are independent of the storage resources assigned to the LU's in the first and second logic groups, so that the LU's in the default logical group cannot contend for physical storage resources with the LU's in the first and second logical groups.

5. The method of claim 1, wherein the contention avoidance relations include contention avoidance values for respective pairs of LU's.

6. The method of claim 5, wherein automatically assigning the LU's to the logical groups responsive to predetermined contention avoidance relations among the LU's comprises assigning one of the LU's to a logical group responsive to the LU's contention avoidance values with respect to other LU's already assigned to the logical group.

7. The method of claim 1, wherein the automatic assigning of LU's to logical groups comprises assigning a first one of the LU's to a logical group at a first time, then a next one of the LU's at a next time, so that during the assigning of LU's to logical groups the size of a logical group grows as more LU's are assigned to the logical group, and wherein each LU is assigned, at the time of its respective assignment, to a logical group that is largest among those logical groups having solely LU's compatible with the contention avoidance value for the LU that is being assigned at the time.

8. An apparatus for managing storage contention in an automated storage system, the apparatus comprising:
a processor coupled to a storage device, wherein the storage device is for storing a program for controlling the processor, and wherein the processor is operative with the storage device to execute the program for performing the steps of:
a) assigning logical storage units ("LU's") to logical groups, wherein some of the LU's are grouped together as a first logical group, and others of the LU's are grouped together as a second logical group; and b) assigning physical storage resources responsive to the LU logical groupings, wherein the physical storage resources assigned to the LU's in the first logical group are independent of the physical storage resources assigned to the LU's in the second logic group, so that the LU's in the first logical group cannot contend for physical storage resources with the LU's in the second logical group;

c) wherein step a) comprises automatically assigning the LU's to the logical groups responsive to predetermined contention avoidance relations among the LU's.

9. The apparatus of claim 8, wherein the contention avoidance relations include contention avoidance values for respective pairs of LU's.

10. The apparatus of claim 9, wherein automatically assigning the LU's to the logical groups responsive to predetermined contention avoidance relations among the LU's comprises assigning one of the LU's to a logical group responsive to the LU's contention avoidance values with respect to other LU's already assigned to the logical group.

11. The apparatus of claim 8, wherein the automatic assigning of LU's to logical groups comprises assigning a first one of the LU's to a logical group at a first time, then a next one of the LU's at a next time, so that during the assigning of LU's to logical groups the size of a logical group grows as more LU's are assigned to the logical group, and wherein each LU is assigned, at the time of its respective assignment, to a logical group that is largest among those logical groups having solely LU's compatible with the contention avoidance value for the LU that is being assigned at the time.

12. A computer program product for managing storage contention in an automated storage system, the computer program product comprising:
a) instructions for assigning logical storage units ("LU's") to logical groups, wherein some of the LU's are grouped together as a first logical group, and others of the LU's are grouped together as a second logical group; and b) instructions for assigning physical storage resources responsive to the LU logical groupings, wherein the physical storage resources assigned to the LU's in the first logical group are independent of the physical storage resources assigned to the LU's in the second logic group, so that the LU's in the first logical group cannot contend for physical storage resources with the LU's in the second logical group;

c) wherein a) comprises instructions for automatically assigning the LU's to the logical groups responsive to predetermined contention avoidance relations among the LU's.

13. The computer program product of claim 12, wherein the contention avoidance relations include contention avoidance values for respective pairs of LU's.

14. The computer program product of claim 13, wherein automatically assigning the LU's to the logical groups responsive to predetermined contention avoidance relations among the LU's comprises assigning one of the LU's to a logical group responsive to the LU's contention avoidance values with respect to other LU's already assigned to the logical group.

15. The computer program product of claim 13, wherein the automatic assigning of LU's to logical groups comprises assigning a first one of the LU's to a logical group at a first time, then a next one of the LU's at a next time, so that during the assigning of LU's to logical groups the size of a logical group grows as more LU's are assigned to the logical group, and wherein each LU is assigned, at the time of its respective assignment, to a logical group that is largest among those logical groups having solely LU's compatible with the contention avoidance value for the LU that is being assigned at the time.

16. The computer program product of claim 13, wherein b) comprises instructions for assigning physical storage resources to the LU's such that the LU's within the first logical group are capable of contending with one another for the physical storage resources, and the LU's within the second logical group are capable of contending with one another for the physical storage resources.

* * * * *